United States Patent
Liang et al.

(10) Patent No.: US 7,391,893 B2
(45) Date of Patent: Jun. 24, 2008

(54) SYSTEM AND METHOD FOR THE DETECTION OF SHAPES IN IMAGES

(75) Inventors: Jianming Liang, Paoli, PA (US); Luca Bogoni, Philadelphia, PA (US); Alok Gupta, Bryn Mawr, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 675 days.

(21) Appl. No.: 10/858,270

(22) Filed: Jun. 1, 2004

(65) Prior Publication Data

US 2004/0264778 A1    Dec. 30, 2004

Related U.S. Application Data

(60) Provisional application No. 60/483,285, filed on Jun. 27, 2003.

(51) Int. Cl.
*G06K 9/00* (2006.01)

(52) U.S. Cl. .............................. 382/128; 382/254; 378/4

(58) Field of Classification Search .................. 382/128, 382/129, 130–133, 154, 168, 172–173, 190, 382/203, 232, 255, 274–275, 276, 100, 181, 382/243, 254, 291, 305; 345/419, 424; 378/4, 378/23
See application file for complete search history.

(56) References Cited

U.S. PATENT DOCUMENTS

| | | | |
|---|---|---|---|
| 6,556,696 B1 * | 4/2003 | Summers et al. ............ | 382/128 |
| 6,766,043 B2 * | 7/2004 | Zeng et al. .................. | 382/128 |
| 6,882,743 B2 * | 4/2005 | Bansal et al. ............... | 382/131 |
| 7,010,164 B2 * | 3/2006 | Weese et al. ................ | 382/173 |
| 7,133,041 B2 * | 11/2006 | Kaufman et al. ............ | 345/419 |
| 7,221,787 B2 * | 5/2007 | Luo et al. ................... | 382/132 |

* cited by examiner

*Primary Examiner*—Seyed Azarian (57) ABSTRACT

A system and method for detecting a shape in an image are provided. The method comprises: constructing a deformable model from an image; deforming the deformable model to remove an undesired shape in a portion of the image; computing properties of the deformed model to enable detection of a desired shape in the portion of the image; and detecting the desired shape based on the computed properties.

29 Claims, 5 Drawing Sheets

(A) Before stretching (B) After stretching

SYSTEM AND METHOD FOR THE DETECTION OF SHAPES IN IMAGES

CROSS-REFERENCE TO RELATED APPLICATIONS

This application claims the benefit of U.S. Provisional Application No. 60/483,285, filed Jun. 27, 2003, a copy of which is herein incorporated by reference.

BACKGROUND OF THE INVENTION

1. Technical Field

The present invention relates to detecting shapes in images, and more particularly, to a system and method for the detection of shapes, such as polyps and diverticuloses, in one or more images acquired for a virtual colonoscopy.

2. Discussion of the Related Art

In the field of medical imaging, various systems have been developed for generating medical images of various anatomical structures of individuals for the purposes of screening and evaluating medical conditions. These imaging systems include, for example, computed tomography (CT) imaging, magnetic resonance imaging (MRI), positron emission tomography (PET), etc. Each imaging modality may provide unique advantages over other modalities for screening and evaluating certain types of diseases, medical conditions or anatomical abnormalities, including, for example, colonic polyps, aneurysms, lung nodules, calcification on heart or artery tissue, cancer micro-calcifications or masses in breast tissue, and various other lesions or abnormalities.

For example, CT imaging systems can be used to obtain a set of cross-sectional images or two-dimensional (2D) "slices" of a region or interest (ROI) of a patient for purposes of imaging organs and other anatomies. The CT modality is commonly employed for purposes of diagnosing disease because such a modality provides precise images that illustrate the size, shape, and location of various anatomical structures such as organs, soft tissues, and bones, and enables a more accurate evaluation of lesions and abnormal anatomical structures such as cancer, polyps, etc.

One method that physicians, clinicians, radiologists, etc., use for diagnosing and evaluating medical conditions is to manually review hard-copies (X-ray films, prints, photographs, etc.) of medical images that are reconstructed from an acquired dataset, to discern characteristic features of interest. For example, CT image data that is acquired during a CT examination can be used to produce a set of 2D medical images (X-ray films) that can be viewed to identify potential abnormal anatomical structures or lesions by a trained physician, clinician, radiologist, etc. In another method, a virtual colonoscopy is used to review medical images that include normal anatomical structures corresponding to the colon. A trained radiologist, for example, may be able to identify small polyps among these structures that are potentially cancerous or pre-cancerous. However, the trained radiologist may overlook a medical condition such as colonic polyps due to human error.

Accordingly, various image processing systems and tools have been developed to assist physicians, clinicians, radiologists, etc. in evaluating medical images to diagnose medical conditions. For example, computer-aided detection (CAD) tools have been developed for various clinical applications to provide automated detection of medical conditions in medical images. In general, CAD systems employ methods for digital signal processing of image data (e.g., CT data) to automatically detect colonic polyps and other abnormal anatomical structures such as lung nodules, lesions, aneurysms, calcification on heart or artery tissue, micro-calcifications or masses in breast tissue, etc.

Although such CAD systems are useful for diagnostic purposes, they typically rely on expensive procedures associated with candidate (e.g., colonic polyps and/or diverticuloses) generation. In addition, they suffer from high false positives (e.g., incorrectly identifying normal tissues as abnormal) and false negatives (e.g., failing to correctly identify abnormalities).

Accordingly, there is a need for CAD a system and method that accurately detects shapes associated with medical conditions such as colonic polyps in medical images to reduce the amount of false positives and/or false negatives.

SUMMARY OF THE INVENTION

The present invention overcomes the foregoing and other problems encountered in the known teachings by providing a system and method for detecting a shape in an image.

In one embodiment of the present invention, a method for detecting a shape in an image comprises: constructing a deformable model from an image; deforming the deformable model to remove an undesired shape in a portion of the image; computing properties of the deformed model to enable detection of a desired shape in the portion of the image; and detecting the desired shape based on the computed properties.

The method further comprises selecting the portion of the image to be deformed, and acquiring the image. The image is acquired by one of a computed tomographic (CT), helical CT, x-ray, positron emission tomographic, fluoroscopic, ultrasound, and magnetic resonance (MR) imaging technique. The image is a medical image of an anatomic part.

The deforming step further comprises identifying the undesired shape in the portion of the image. The deformable model is one of a dynamic, probabilistic, symmetry-seeking, and superquadric deformable model. The deformable model is one of a hybrid deformable model, and a hierarchy of deformable models. The deformable model is deformed by performing one of a stretching, bending, and twisting technique.

The desired shape is preserved and enhanced with regard to the undesired shape after deforming the deformable model. The undesired shape is a colonic fold. The desired shape is one of a sphere-like shape, an ellipsoid-like shape, a polyp-like shape, a portion of a sphere-like shape, and a portion of an ellipsoid-like shape. The desired shape is detected using a computer-aided detection technique.

The computed properties comprise at least one of an internal energy, external energy, internal force, external force, distance, and geometric shape of the deformed model. The computed properties may also be a probabilistic measure of at least one of an internal energy, external energy, internal force, external force, distance, and geometric shape of the deformed model.

The method further comprises: displaying one of the deformable and deformed models during one of the constructing step, deforming step, computing step, and detecting step; interactively adjusting one of the deformable and deformed models during one of the constructing step, deforming step, computing step, and detecting step; and segmenting the image before constructing the deformable model.

In another embodiment of the present invention, a system for detecting shapes in an image comprises: a memory device for storing a program; a processor in communication with the memory device, the processor operative with the program to:

construct a deformable model from an image; deform the deformable model to remove undesired shapes in a portion of the image; compute properties of the deformed model to enable detection of desired shapes in the portion of the image; and detect the desired shapes based on the computed properties.

The processor is further operative with the program to select the portion of the image to be deformed, and acquire the image, wherein the image is a medical image of an anatomical part. The image is acquired by one of a CT, helical CT, x-ray, positron emission tomographic, fluoroscopic, ultrasound, and MR imaging technique.

The deforming step further comprises identifying the undesired shapes in the portion of the image. The deformable model is one of a dynamic, probabilistic, symmetry-seeking, and superquadric deformable model. The deformable model is one of a hybrid deformable model, and a hierarchy of deformable models, wherein the hierarchy of deformable models comprises at least one of a dynamic, probabilistic, symmetry-seeking, and superquadric deformable model. The deformable model is deformed by performing one of a stretching, bending, and twisting technique.

The desired shapes are preserved and enhanced with regard to the undesired shapes after deforming the deformable model, wherein the undesired shapes undergo a substantial deformation during the deformation step. The undesired shapes are colonic folds. The desired shapes are one of sphere-like shapes, ellipsoid-like shapes, polyp-like shapes, portions of sphere-like shapes, and portions of ellipsoid-like shapes. The desired shapes are detected using a computer-aided detection technique.

The computed properties comprise at least one of an internal energy, external energy, internal force, external force, distance, and geometric shape of the deformed model. The computed properties may also be a probabilistic measure of at least one of an internal energy, external energy, internal force, external force, distance, and geometric shape of the deformed model.

The processor is further operative with the program to: display one of the deformable and deformed models during one of the constructing step, deforming step, computing step, and detecting step; enable interactive adjustment of one of the deformable and deformed models during one of the constructing step, deforming step, computing step, and detecting step; and segment the image before constructing the deformable model.

In yet another embodiment of the present invention, a computer program product comprising a computer useable medium having computer program logic recorded thereon for detecting a shape in an image, the computer program logic comprises: program code for constructing a deformable model from an image; program code for deforming the deformable model to remove an undesired shape in a portion of the image; program code for computing properties of the deformed model to enable detection of a desired shape in the portion of the image; and program code for detecting the desired shape based on the computed properties.

In another embodiment of the present invention, a system for detecting a shape in an image comprises: means for constructing a deformable model from an image; means for deforming the deformable model to remove an undesired shape in a portion of the image; means for computing properties of the deformed model to enable detection of a desired shape in the portion of the image; and means for detecting the desired shape based on the computed properties.

In yet another embodiment of the present invention, a method for detecting polyps in an image of a colon comprises: acquiring an image of a colon using a scanner; constructing a deformable model from the image; selecting a portion of the image for deforming; deforming the selected portion of the image to remove colonic folds, wherein the selected portion is deformed by one of a stretching, bending, and twisting technique; computing properties of the deformed portion to enable detection of polyps in the deformed portion of the image; and detecting the polyps based on the computed properties using a computer-aided polyp detection technique.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
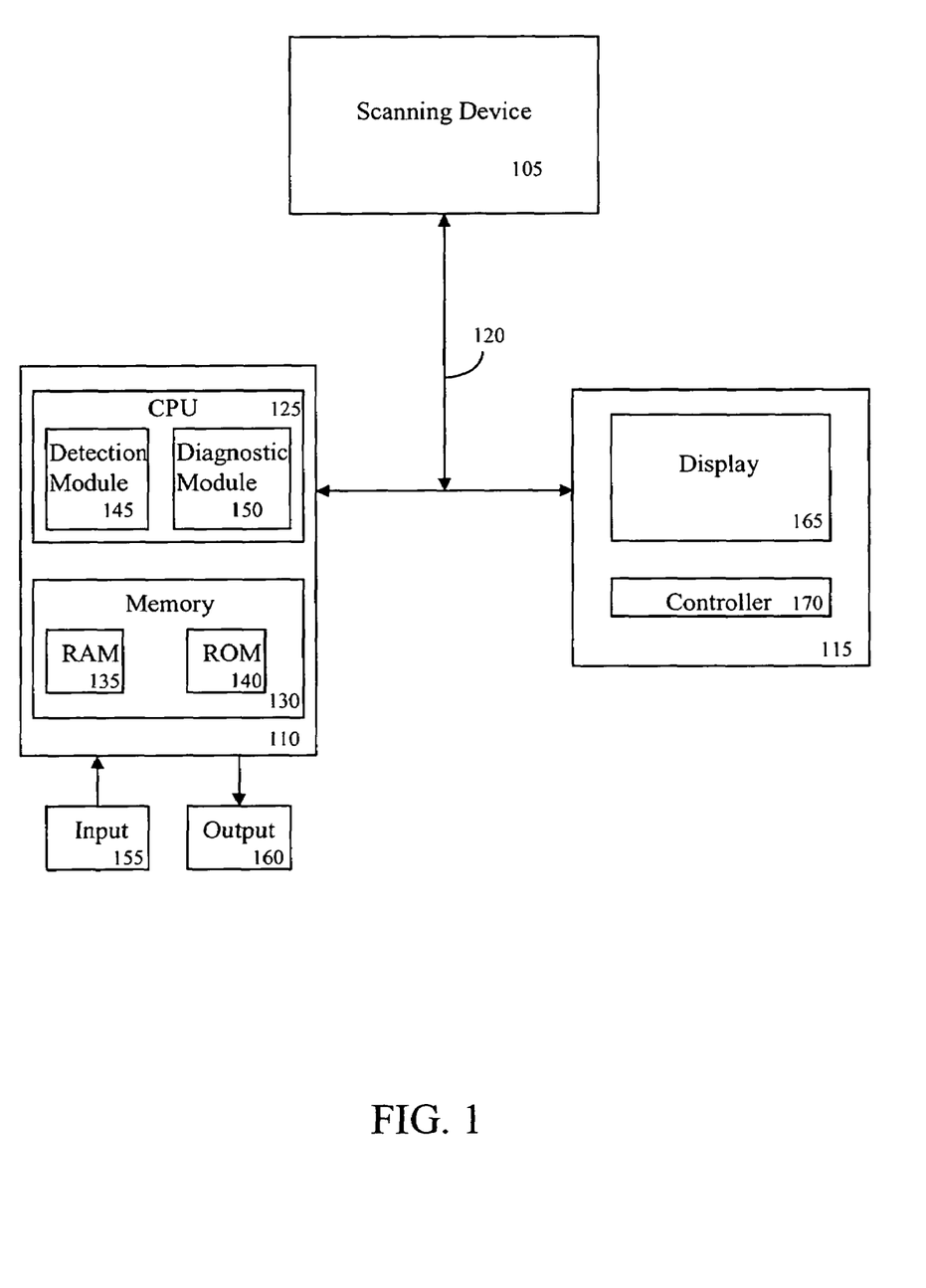
FIG. 1 is a block diagram of a system for detecting a shape in an image according to an exemplary embodiment of the present invention.

FIG. 1 is a block diagram of a system 100 for detecting a shape in an image according to an exemplary embodiment of the present invention. As shown in FIG. 1, the system 100 includes, inter alia, a scanning device 105, a personal computer (PC) 110 and an operator's console 115 connected over, for example, an Ethernet network 120. The scanning device 105 may be a magnetic resonance imaging (MRI) device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device, etc.

The PC 110, which may be a portable or laptop computer, a personal digital assistant (PDA), etc., includes a central processing unit (CPU) 125 and a memory 130, which are connected to an input 155 and an output 160. The CPU 125 includes a detection module 145, which is a computer-aided detection (CAD) module that includes one or more methods for detecting a shape, such as a polyp, in a medical image. The CPU 125 further includes a diagnostic module 150, which is used to perform automated diagnostic or evaluation functions of image data.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 155 is constituted by a keyboard, mouse, etc., and the output 160 is constituted by a liquid crystal display (LCD), cathode ray tube (CRT) display, printer, etc.

The operation of the system 100 is controlled from the operator's console 115, which includes a controller 170, for example, a keyboard, and a display 165, for example, a CRT display. The operator's console 115 communicates with the PC 110 and the scanning device 105 so that 2D image data collected by the scanning device 105 can be rendered into 3D data by the PC 110 and viewed on the display 165. It is to be understood that the PC 110 can be configured to operate and display information provided by the scanning device 105 absent the operator's console 115, using, for example, the input 155 and output 160 devices to execute certain tasks performed by the controller 170 and display 165.

The operator's console 115 may further include any suitable image rendering system/tool/application that can process digital image data of an acquired image dataset (or portion thereof) to generate and display 2D and/or 3D images on the display 165. More specifically, the image rendering system may be an application that provides 2D/3D rendering and visualization of medical image data, and which executes on a general purpose or specific computer workstation. Moreover, the image rendering system may include a graphical user interface (GUI), which enables a user to navigate through a 4D or 3D image or a plurality of 2D image slices. The PC 110 may also include an image rendering system/tool/application for processing digital image data of an acquired image dataset to generate and display 2D, 3D and/or 4D images.

As shown in FIG. 1, the detection module 145 and the diagnostic module 150 are also used by the PC 110 to receive and process digital image data, which as noted above, may be in the form of raw image data, 2D reconstructed data (e.g., axial slices), or 3D or 4D reconstructed data such as volumetric image data or multiplanar reformats, or any combination of such formats. The data processing results can be output from the PC 110 via the network 120 to an image rendering system in the operator's console 115 for generating 2D, 3D and/or 4D renderings of image data in accordance with the data processing results, such as segmentation of organs or anatomical structures, color or intensity variations, and so forth.

It is to be understood that CAD systems and methods according to the present invention for detecting shapes in an image may be implemented as extensions or alternatives to conventional CAD methods or other automated detection methods for processing image data. Further, it is to be appreciated that the exemplary systems and methods described herein can be readily implemented with 3D or 4D medical images and CAD systems or applications that are adapted for a wide range of imaging modalities (e.g., CT, MRI, etc.) and for diagnosing and evaluating various abnormal anatomical structures or lesions such as colonic polyps, aneurysms, lung nodules, etc. In this regard, although exemplary embodiments may be described herein with reference to particular imaging modalities or particular anatomical features, nothing should be construed as limiting the scope of the invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

Figure 2:
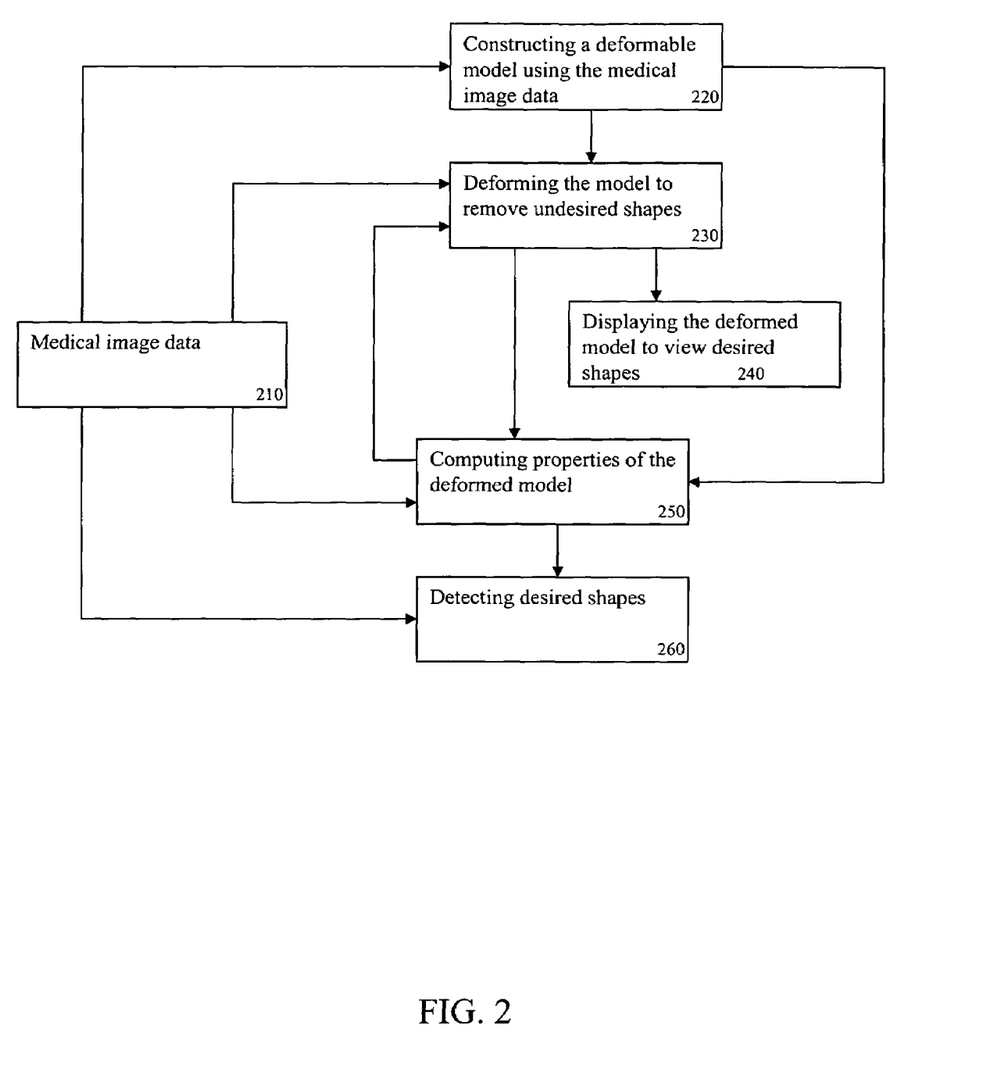
FIG. 2 is a flowchart illustrating a method for detecting a shape in an image according to an exemplary embodiment of the present invention.

FIG. 2 is a flowchart showing an operation of a method for detecting shapes in an image according to an exemplary embodiment of the present invention. As shown in FIG. 2, 3D data is acquired from an image, for example, of a colon (step 210). This is accomplished by using the scanning device 105, for example a CT scanner, operated at the operator's console 115, to scan the colon thereby generating a series of 2D images associated with the colon. The 2D images of the colon may then be converted or transformed into a 3D rendered image. It is to be understood that the image, which may be an image of an abdomen thus including the colon, may also include any one of a pancreas, a bronchi, a larynx, a trachea, a sinus, an ear canal, a blood vessel, a urethra and a bladder, etc. The image can also be a non-tubular structure, such as the lung-parenchyma or liver. The image may also be, e.g., a 4D image that includes a temporal component resulting, for example, from contrast agents and perfusion.

Although not illustrated in FIG. 2, a variety of pre-processing techniques may be performed on the 3D and/or 4D data. For example, the data may be segmented such that the colon's surface or wall is segmented from other structures in the image. The segmentation may also be limited to a certain portion of the colon or a target area in the image. It is to be understood that a variety of segmentation techniques may be used in accordance with the present invention, such as Region Growing, Thresholding, Gaussian Smoothing, Edge Detection, and Connected Component Labeling, etc.

After the data is acquired from the colon, a deformable model of the 3D data is constructed (step 220). Deformable models are a class of energy minimizing splines that are controlled by an energy function. The energy function has two portions: internal energy and external energy. The internal energy characterizes the energy of the spline due to elastic and bending deformations. The external energy is characterized by the image forces that attract the model toward image features such as edges.

Figure 3:
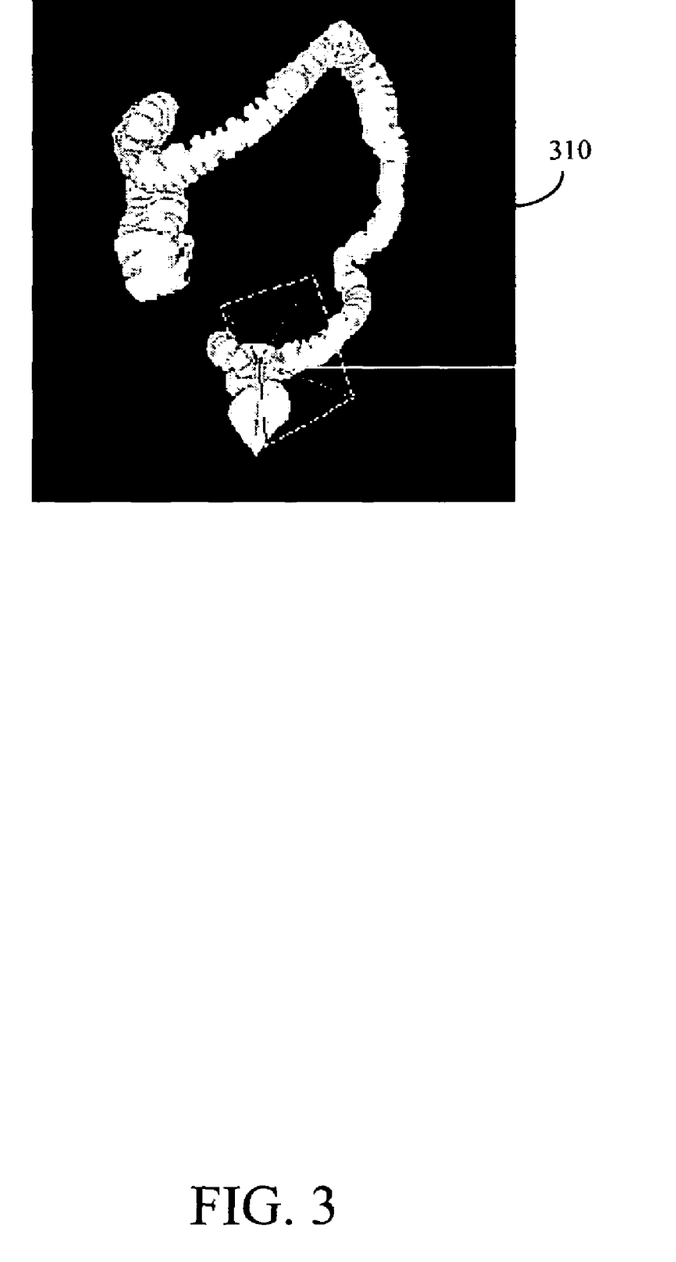
FIG. 3 is a global view of a model of a colon that is used to construct a deformable model.

Based on an initial estimate, the model is deformed, for example, by minimizing its associated energy function. This may be accomplished by using a variational technique to solve the minimization problem via the Euler-Lagrange method. Other optimization techniques include dynamic programming, greedy optimization, finite element, dynamic, probabilistic, symmetry-seeking, superquadric, etc. methods. FIG. 3 illustrates a global view of a model of a colon 310 that is used to construct a deformable model. More specifically, FIG. 3 is a visualization of the colon, which can be segmented, prior to being deformed and processed by applying deformable modeling techniques. It is to be understood, however, that the model of FIG. 3 may be directly derived from the image data without undergoing segmentation.

Subsequent to step 220, the model is deformed (step 230). More specifically, the model is deformed by stretching. This is accomplished by selecting the entire deformable model or a portion of the deformable model for stretching. It is to be understood, however, that model can also be subjected to other deforming techniques such as bending and twisting, etc. Once the selection is made the selected portion of the model is deformed, for example, by applying loads for pulling and pushing the selected portion to approximate locations and/or constraints for controlling the shape of the selected portion at locations where such control is required. The loads applied to the selected portion may be different types of forces and/or energy, for example, pressures, springs, gravity (a vector load), and attractors. The constraints applied to the selected portion may be used to interpolate a set of points and/or curves in space. It is to be understood that the deformable model or a selection portion thereof may be deformed using a variety of deforming techniques such as dynamic programming, greedy optimization, finite element, etc. It is to be further understood that the deformable model may be a hybrid deformable model or a hierarchy of deformable models, wherein the hierarchy of deformable models includes one or more of the dynamic, probabilistic, symmetry-seeking, and superquadric deformable models.

As a result of applying forces to the deformable model of the colon or a portion thereof, undesired shapes such as colonic folds are removed from the colon because the colon has been deformed (in this example stretched). However, desired shapes such as polyps and diverticuloses, which may take the form of spheres, portions of spheres. ellipsoids, and portions of ellipsoids, are preserved. Another result of applying forces to the colon or a portion thereof is the identification of undesired shapes. This is accomplished, for example, by observing undesired shapes being deformed during the deforming process. A longitudinal cross-section of a portion of a deformable model of a colon before and after deformation is illustrated in FIG. 4.

Figure 4:
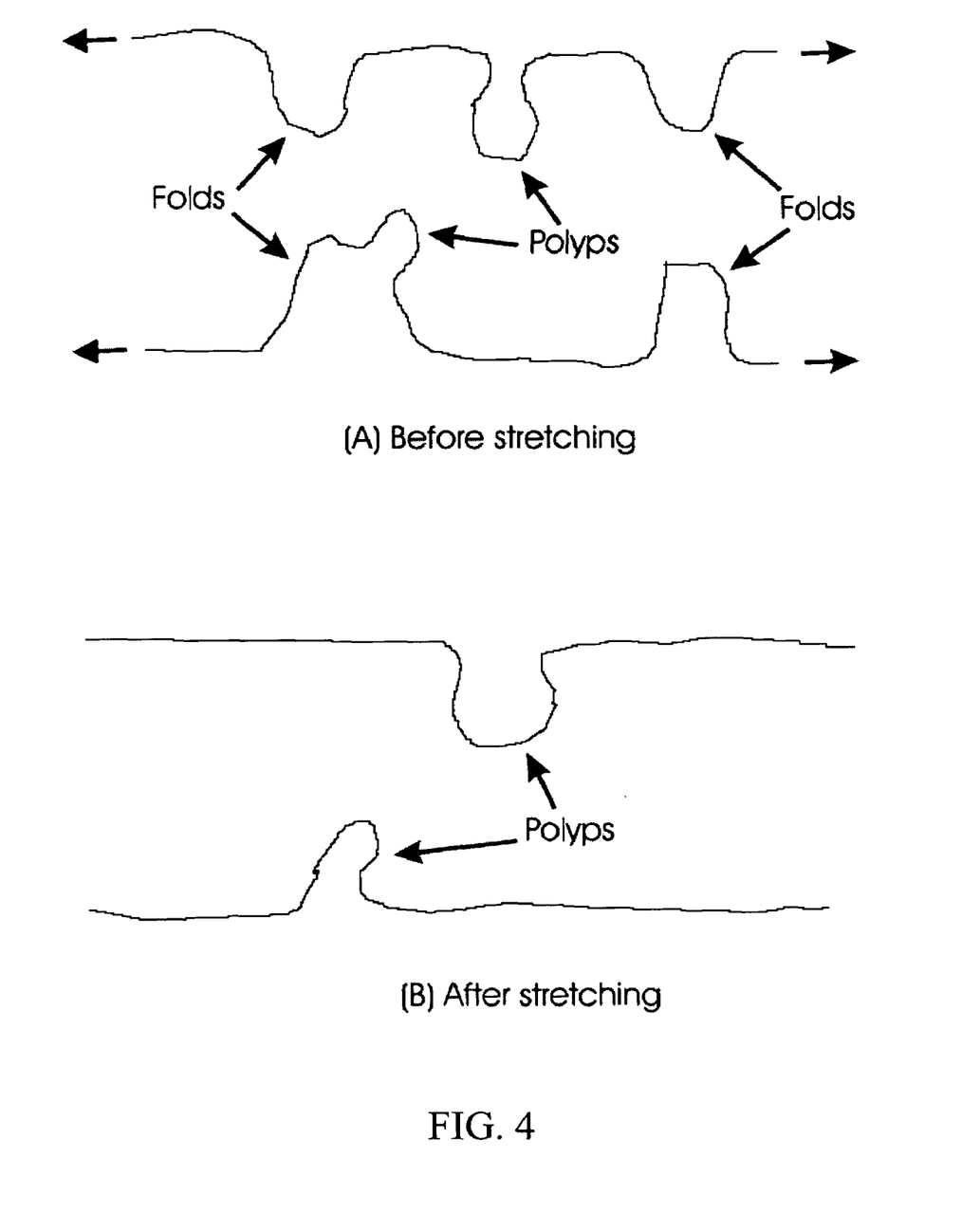
FIG. 4 is a longitudinal cross-section of a deformable model of a colon before and after being deformed according to an exemplary embodiment of the present invention.

As shown in FIG. 4, image (A) illustrates the interior of a portion of the colon before it has been stretched, and image (B) illustrates the interior of the portion of the colon after it was stretched. As can be observed in the image (B), the folds in the image (A) are removed as external forces are applied to the ends of the image (A) (indicated by the arrows in the outward facing directions), and the polyps in the image (A) remain after stretching. Thus enabling detection of polyps and/or diverticuloses in the stretched image (B).

After the model is deformed, it may be viewed by a user on a display, e.g., 165 (step 240). In this step, a user may interactively manipulate the deformed model to visually determine, for example, if colonic folds have been adequately removed, request that the model undergo further deformations, select another portion of the model for further deformation, or interactively correct the deformation. In addition to displaying the model to allow the user to interact with the model not only for visualization purposes (e.g., rotating, scaling, etc.), additional forces or energy may be applied to the model to coerce the model into different evolutions of deformation to compensate, for example, for residual stool remaining in the colon after surgical operations.

Subsequent to steps 230 and/or 240, various properties of the deformable model are calculated to further enhance the shapes of interest (step 250). Some of the properties of the deformed model that are calculated in this step are: (1) the distance of each element in the model to the model's center; (2) the internal and external energy associated with the model; (3) the internal forces within the model and the external forces applied to the model; (4) the geometric properties of the model including its size, symmetry and curvature, etc.; and (5) statistical and/or probabilistic properties associated with (2) and (3) as well as those that maybe derived from (4).

Figure 5:
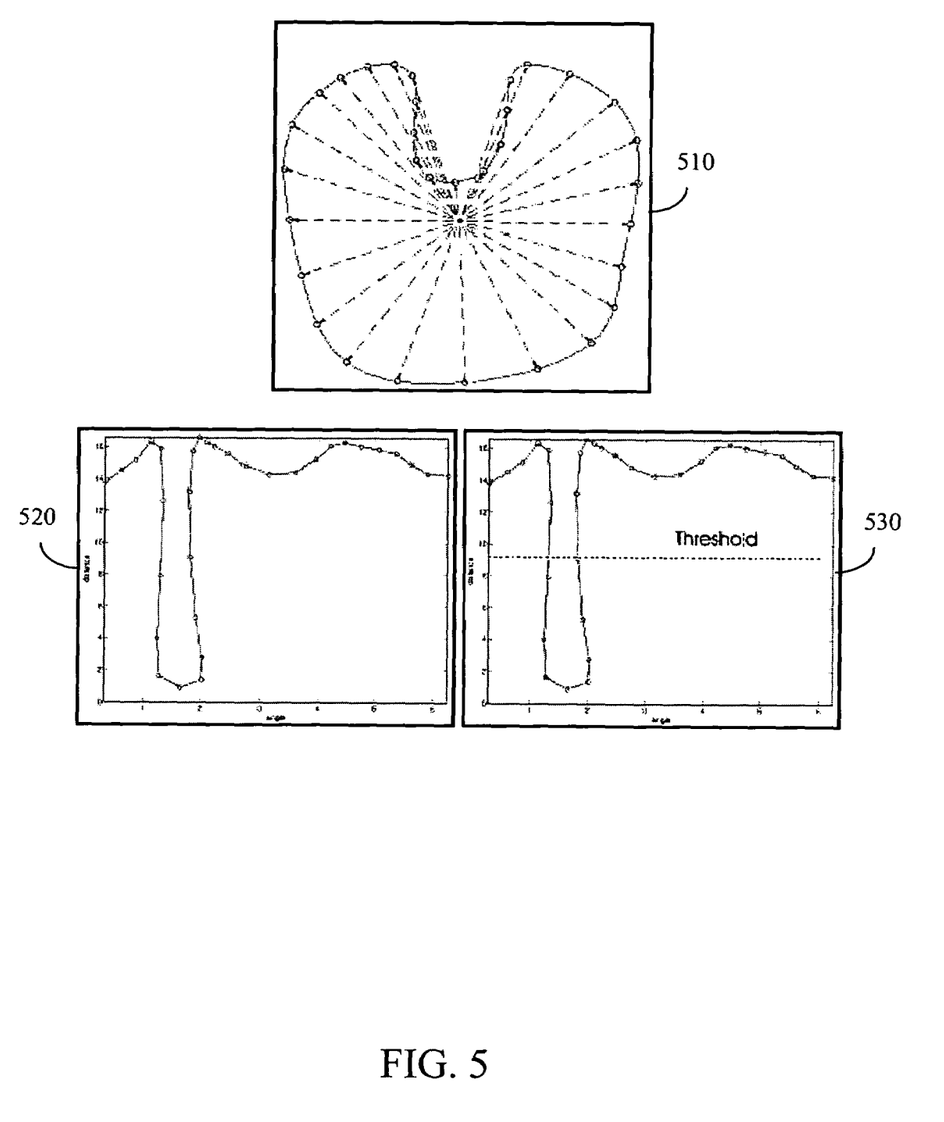
FIG. 5 illustrates properties of the deformable model of FIG. 4 after being deformed in accordance with an exemplary embodiment of the present invention.

It is to be further understood that the above-referenced properties may be considered as features of the deformable model. In addition, the features may be computed for any location on the surface of the model, and may be used together in order or alone to further enhance visualization and analysis of the model. Image 510 of FIG. 5 illustrates an exemplary calculation of a distance of each element in a portion of the deformable model from a center point. As shown in the image 510, a polyp is visible as indicated by the downward facing protrusion.

After computing the model's properties and/or features and in some instances proceeding through multiple iterations of steps 220-250 to reduce the effects of colonic folds and thus enhance the visibility of polyps and diverticuloses, the resulting data is subject to a computer-aided detection (CAD) technique to detect the desired shapes (step 260). As a result of the iterative process (e.g., repeating steps 220-250), structures that protrude from the colon's wall can be detected based, for example, on their distance from the model's surface, their resulting symmetric energy patterns, and their computed properties. For each of the detected protrusions, various properties may be calculated and proposed as candidate lesions based on a CAD technique that, for example, uses a classifier, or applies a threshold to the calculated properties. For example, as shown in FIG. 5, image 520 illustrates the computed distance signal of the image 510, and image 530 illustrates a threshold being applied to the computed distance signal to detect the polyp of the image 510. As shown in the image 530, the area located below the threshold is detected by the CAD technique as a desired shape and/or a polyp, while the area above the threshold is filtered out and not presented to a user as a polyp candidate.

After step 260, the detected shapes are stored, for example, in the memory 130 of the CPU 125 for further analysis or the detected shapes are immediately subject to analysis by, for example, a medical professional using a conventional CAD technique. During the analysis, the acquired data is filtered, as discussed with reference to the image 530, to determine if the detected shapes are, for example, nodules, lesions, polyps, pre-cancerous growths, or cancerous growths. If they are not, they are filtered or removed from the data set and/or indicated as false positives.

In accordance with the present invention, candidate polyps in a colon can be detected by constructing a deformable model from an image of a colon, deforming the model, calculating its properties, and applying a conventional CAD technique to identify the candidate polyps. Accordingly, conventional CAD systems can be enhanced by employing the present invention to increase accuracy, and to reduce cost and analysis time associated with the interpretation of medical conditions such as colonic polyps in medical images.

It is to be further understood that, because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for detecting a polyp-like object in a tubular anatomy, comprising:
   receiving an image of a tubular anatomy;
   constructing a deformable model of the tubular anatomy;
   deforming the deformable model to flatten a fold located on a surface of the tubular anatomy and preserve a polyp-like object located on the surface;
   computing properties of the deformable model after the deformable model has been deformed to enhance detection of the polyp-like object in the image; and
   detecting the polyp-like object in the image based on the computed properties;
   wherein the deformable model is deformed to fit to the tubular anatomy by optimizing an energy function of the deformable model.

2. The method of claim 1, further comprising:
   acquiring the image.

3. The method of claim 2, wherein the image is acquired by one of a computed tomographic (CT), helical CT, x-ray, positron emission tomographic, fluoroscopic, ultrasound, and magnetic resonance (MR) imaging technique.

4. The method of claim 1, wherein the entire deformable model or a selected portion of the deformable model is deformed during the deforming step.

5. The method of claim 1, wherein the deforming step further comprises:
   identifying the fold.

6. The method of claim 1, wherein the deformable model is one of a dynamic, probabilistic, symmetry-seeking, and superquadric deformable model.

7. The method of claim 1, wherein the deformable model is one of a hybrid deformable model, and a hierarchy of deformable models.

8. The method of claim 1, wherein the computed properties comprise at least one of an internal energy, external energy, internal force, external force, distance, and geometric shape of the deformable model.

9. The method of claim 1, wherein the computed properties comprise a probabilistic measure of at least one of an internal energy, external energy, internal force, external force, distance, and geometric shape of the deformable model.

10. The method of claim 1, wherein the polyp-like object is detected using a computer-aided detection technique.

11. The method of claim 1, further comprising:
    displaying the deformable model during one of the constructing step, deforming step, computing step, and detecting step.

12. The method of claim 1, further comprising:
    interactively adjusting the deformable model during one of the constructing step, deforming step, computing step, and detecting step.

13. The method of claim 1, further comprising:
    segmenting the image before constructing the deformable model.

14. A system for detecting a polyp-like object in a tubular anatomy, comprising:
    a memory device for storing a program;
    a processor in communication with the memory device, the processor operative with the program to:
    receive an image of a tubular anatomy;
    construct a deformable model of the tubular anatomy;
    deform the deformable model to flatten a fold located on a surface of the tubular anatomy and preserve a polyp-like object located on the surface;
    compute properties of the deformable model after the deformable model has been deformed to enhance detection of the polyp-like object in the image; and
    detect the polyp-like object in the image based on the computed properties;
    wherein the deformable model is deformed to fit to the tubular anatomy by optimizing an energy function of the deformable model.

15. The system of claim 14, wherein the processor is further operative with the program to: acquire the image.

16. The system of claim 15, wherein the image is acquired by one of a computed tomographic (CT), helical CT, x-ray, positron emission tomographic, fluoroscopic, ultrasound, and magnetic resonance (MR) imaging technique.

17. The system of claim 14, wherein the entire deformable model or a selected portion of the deformable model is deformed during the deforming step.

18. The system of claim 14, wherein the deforming step further comprises identifying the fold.

19. The system of claim 14, wherein the deformable model is one of a dynamic, probabilistic, symmetry-seeking, and superquadric deformable model.

20. The system of claim 14, wherein the deformable model is one of a hybrid deformable model, and a hierarchy of deformable models, wherein the hierarchy of deformable models comprises at least one of a dynamic, probabilistic, symmetry-seeking, and superquadric deformable model.

21. The system of claim 14, wherein the computed properties comprise at least one of an internal energy, external energy, internal force, external force, distance, and geometric shape of the deformable model.

22. The system of claim 14, wherein the computed properties comprise a probabilistic measure of at least one of an internal energy, external energy, internal force, external force, distance, and geometric shape of the deformable model.

23. The system of claim 14, wherein the polyp-like object is detected using a computer-aided detection technique.

24. The system of claim 14, wherein the processor is further operative with the program to:
    display the deformable model during one of the constructing step, deforming step, computing step, and detecting step.

25. The system of claim 14, wherein the processor is further operative with the program to:
    enable interactive adjustment of the deformable model during one of the constructing step, deforming step, computing step, and detecting step.

26. The system of claim 14, wherein the processor is further operative with the program to:
    segment the image before constructing the deformable model.

27. A computer program product comprising a computer useable medium having computer program logic recorded thereon for detecting a polyp-like object in a tubular anatomy, the computer program logic comprising:
    program code for receiving an image of a tubular anatomy;
    program code for constructing a deformable model of the tubular anatomy;
    program code for deforming the deformable model to flatten a fold located on a surface of the tubular anatomy and preserve a polyp-like object located on the surface;
    program code for computing properties of the deformable model after the deformable model has been deformed to enhance detection of the polyp-like object in the image; and
    program code for detecting the polyp-like object in the image based on the computed properties;

wherein the deformable model is deformed to fit to the tubular anatomy by optimizing an energy function of the deformable model.

28. A system for detecting a polyp-like object in a tubular anatomy, comprising:
    means for receiving an image of a tubular anatomy;
    means for constructing a deformable model of the tubular anatomy;
    means for deforming the deformable model to flatten a fold located on a surface of the tubular anatomy and preserve a polyp-like object located on the surface;
    means for computing properties of the deformable model after the deformable model has been deformed to enhance detection of the polyp-like object in the image; and
    means for detecting the polyp-like object in the image based on the computed properties;
    wherein the deformable model is deformed to fit to the tubular anatomy by optimizing an energy function of the deformable model.

29. A method for detecting polyp-like objects in a colon, comprising:
    acquiring an image of a colon using a medical imaging device;
    constructing a deformable model of the colon;
    deforming the deformable model to flatten folds located on a wall of the colon and preserve polyp-like objects located on the wall;
    computing properties of the deformable model after the deformable model has been deformed to enhance detection of polyp-like objects in the image; and
    detecting the polyp-like objects in the image based on the computed properties using a computer-aided polyp-like object detection technique;
    wherein the deformable model is deformed to fit to the colon by optimizing an energy function of the deformable model.

* * * * *